(12) United States Patent
Uchida et al.

(10) Patent No.: US 8,856,485 B2
(45) Date of Patent: Oct. 7, 2014

(54) STORAGE SYSTEM AND STORAGE CONTROL METHOD

(75) Inventors: Kosuke Uchida, Kawasaki (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 767 days.

(21) Appl. No.: 12/751,566

(22) Filed: Mar. 31, 2010

(65) Prior Publication Data

US 2010/0262803 A1 Oct. 14, 2010

(30) Foreign Application Priority Data

Apr. 14, 2009 (JP) .................................. 2009-97916

(51) Int. Cl.
G06F 12/02 (2006.01)
G06F 3/06 (2006.01)
H04L 29/08 (2006.01)

(52) U.S. Cl.
CPC .......... *H04L 67/1097* (2013.01); *G06F 3/0631* (2013.01); *G06F 3/067* (2013.01); *G06F 3/0608* (2013.01)
USPC .......................................... 711/172; 709/216

(58) Field of Classification Search
None
See application file for complete search history.

(56) References Cited

U.S. PATENT DOCUMENTS

| 7,069,295 | B2 * | 6/2006 | Sutherland et al. ........... 709/203 |
| 2002/0129049 | A1 * | 9/2002 | Collins et al. ................. 707/500 |
| 2003/0051117 | A1 * | 3/2003 | Burch et al. ................... 711/173 |
| 2003/0074431 | A1 | 4/2003 | Abbondanzio et al. |
| 2003/0120751 | A1 * | 6/2003 | Husain et al. ................. 709/219 |
| 2003/0212571 | A1 | 11/2003 | Sazawa et al. |
| 2004/0153481 | A1 | 8/2004 | Talluri |
| 2006/0041619 | A1 * | 2/2006 | Gusler et al. .................. 709/205 |
| 2006/0143315 | A1 * | 6/2006 | Rudeseal et al. .................. 710/5 |
| 2009/0198791 | A1 * | 8/2009 | Menghnani .................... 709/215 |

FOREIGN PATENT DOCUMENTS

| JP | 5-334006 | 12/1993 |
| JP | 9-223047 | 8/1997 |
| JP | 2003-323329 | 11/2003 |
| JP | 2004-234058 | 8/2004 |
| JP | 2005-004681 | 1/2005 |
| JP | 2007-87083 | 4/2007 |
| WO | 2007/026380 | 3/2007 |

OTHER PUBLICATIONS

United Kingdom Search Report issued Jul. 23, 2010 in corresponding British Patent Application GB1005490.6.
Japanese Office Action issued Oct. 2, 2012 in corresponding Japanese Patent Application No. 2009-097916.

(Continued)

*Primary Examiner* — Kaushikkumar Patel
(74) *Attorney, Agent, or Firm* — Staas & Halsey LLP (57) ABSTRACT

A storage method and system where the storage system includes a plurality of servers and a control server configured to select a storage area available to be used by each of the servers from among storage areas of a group of storage devices sharable among the plurality of servers. The system includes, a detecting unit configured to detect an available capacity of a specified storage device other than the storage group, where the specified storage device is designated for use only by a specified server selected from among the servers, a specifying unit configured to specify an available area corresponding to the available capacity detected from the specified storage device through the detecting unit, and a setting unit configured to set the specified available area to a shared storage area that is available to be shared among the server.

13 Claims, 9 Drawing Sheets

(56) References Cited

OTHER PUBLICATIONS

United Kingdom Search Report issued Feb. 26, 2013 in corresponding British Patent Application GB1005490.6.

British Examination Report issued Jul. 22, 2013 in corresponding British Application No. GB1005490.6.

* cited by examiner

AVAILABLE CAPACITY: 120GB

FIG.8

| DISK NUMBER | PARTITION NUMBER | ALLOCATION STATE | CAPACITY |
|---|---|---|---|
| 1 | 1 | TASK | 100GB |
| 1 | 2 | TASK | 100GB |
| 1 | 3 | VIRTUAL | 100GB |
| 1 | 4 | VIRTUAL | 100GB |

| IP ADDRESS | DISK NUMBER | PARTITION NUMBER |
|---|---|---|
| 10.77.205.xx | 1 | 4 |
| 10.77.205.xx | 1 | 3 |

STORAGE SYSTEM AND STORAGE CONTROL METHOD

CROSS-REFERENCE TO RELATED APPLICATIONS

This application is based upon and claims the benefit of priority of the prior Japanese Patent Application No. 2009-097916 filed on Apr. 14, 2009, the entire contents of which are incorporated herein by reference.

BACKGROUND

1. Field

Various embodiments discussed herein relate to a storage system, a storage control method, and a computer-readable recording medium that stores a storage control program for controlling a storage.

2. Description of the Related Art

In the past, a storage system including business servers sharing a group of storage devices as a virtual area was disclosed in Japanese Laid-open Patent Publication No. 2005-004681.

Figure 12:
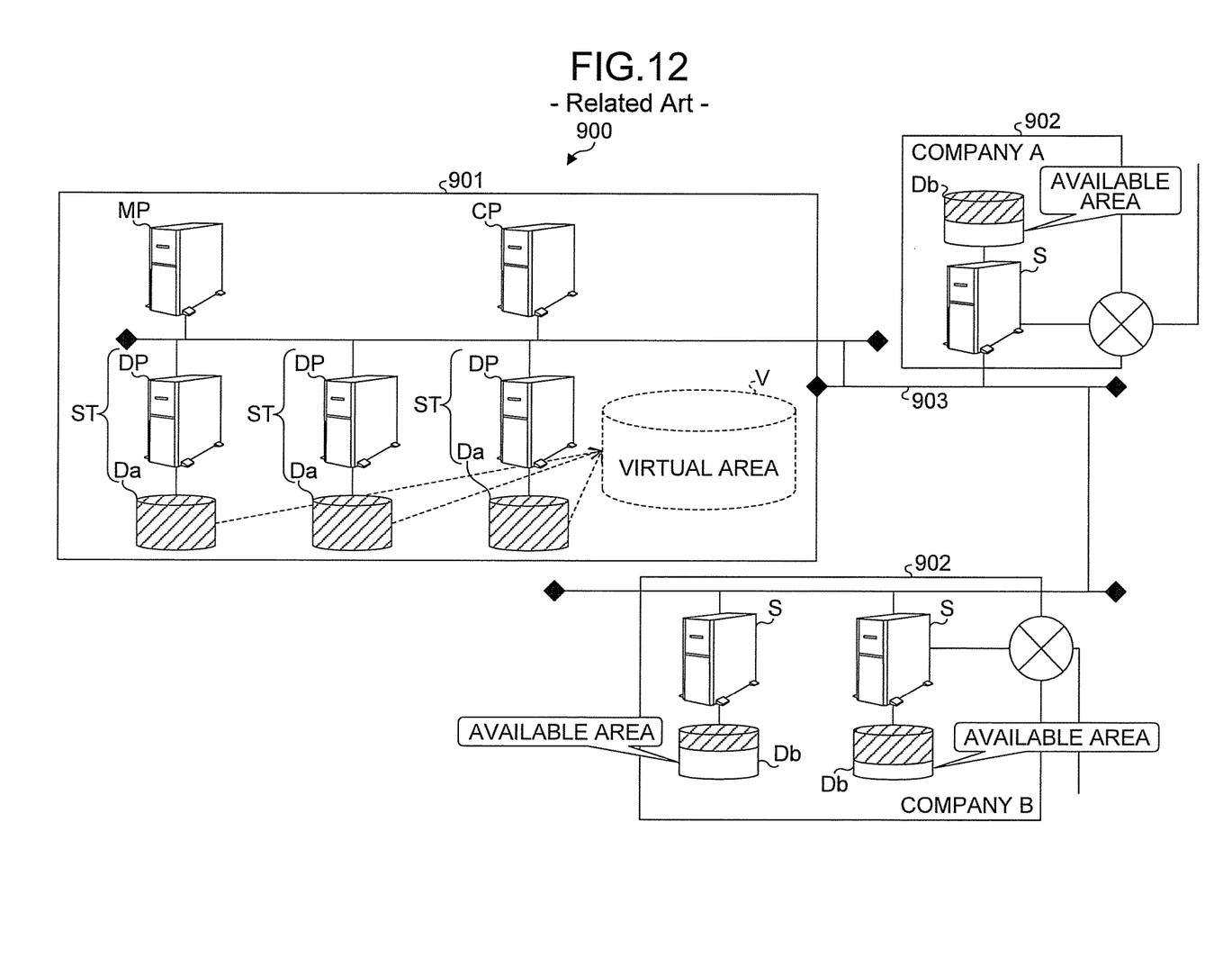
FIG. 12 shows a typical system configuration of a storage system.

FIG. 12 shows a system configuration of a storage system. A storage system 900 includes a data center 901 and a group of business systems 902. In the storage system 900, the data center 901 and the group of business systems 902 are communicably connected to each other via a network 903 including a local area network (LAN), a wide area network (WAN), the Internet, and so forth.

The data center 901 is configured to provide storage service to the group of business systems 902. The storage service denotes computer processing performed to provide data reading and/or data writing to each of the business systems 902. The data center 901 includes a management node MP, a control node CP, and a plurality of storage devices ST. The management node MP is a computer configured to manage a business server S installed at the service provide destination. The control node CP is a computer configured to collectively manage the disk areas of all of physical disks Da.

The storage device ST includes a disk node DP and the physical disk Da. The disk node DP is a computer configured to read data from the physical disk Da and/or write data onto the physical disk Da under the control of the control node CP. The physical disk Da includes a hard disk, a nonvolatile memory, and a magnetic tape.

Disk areas are generated on the physical disk Da in the unit slice. The slice is allocated to each of the business servers S through the management node MP. A slice allocated to a certain business server S extends over a plurality of the physical disks Da. To each of the business servers S, however, the physical disks Da are recognized as a single physical disk. Therefore, the disk areas of all of the physical disks Da are referred to as a virtual area V (or a virtual disk).

The business system 902 is configured to provide various tasks (for example, a Web service, a search service, a storage service, and so forth) and includes the business server S and a physical disk Db specifically provided for the business server S. The business server S is a computer accepting a storage allocation service presented by the data center 901. Each of the business servers S may read data stored in the virtual area V and/or write data onto the virtual area V. In actuality, each of the business servers S accesses a slice generated in the physical disk Da of a disk node DP, the slice being allocated to the business server S, and reads and/or writes data from and/or onto the slice.

The physical disk Db of the business server S is used by the business server S. If the physical disk Db of each of the business servers S includes an available area, it means that a plurality of the available areas is dispersed. In that case, the storage system 900 is operating inefficiently.

SUMMARY

In accordance with an aspect of the embodiments, a storage method and system are provided. The storage system including a plurality of servers and a control server configured to select a storage area available to be used by each of the servers from among storage areas of a group of storage devices sharable among the plurality of servers. The system includes, a detecting unit configured to detect an available capacity of a specified storage device other than the storage group, where the specified storage device is designated for use only by a specified server selected from among the servers, a specifying unit configured to specify an available area corresponding to the available capacity detected from the specified storage device through the detecting unit, and a setting unit configured to set the specified available area to a shared storage area that is available to be shared among the servers.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Hereinafter, a storage control program, a storage system, and a storage control method according to an embodiment of the present invention will be described with reference to the attached drawings, where the storage control program, the storage system, and the storage control method are achieved through the technologies disclosed in this application.

Figure 1:
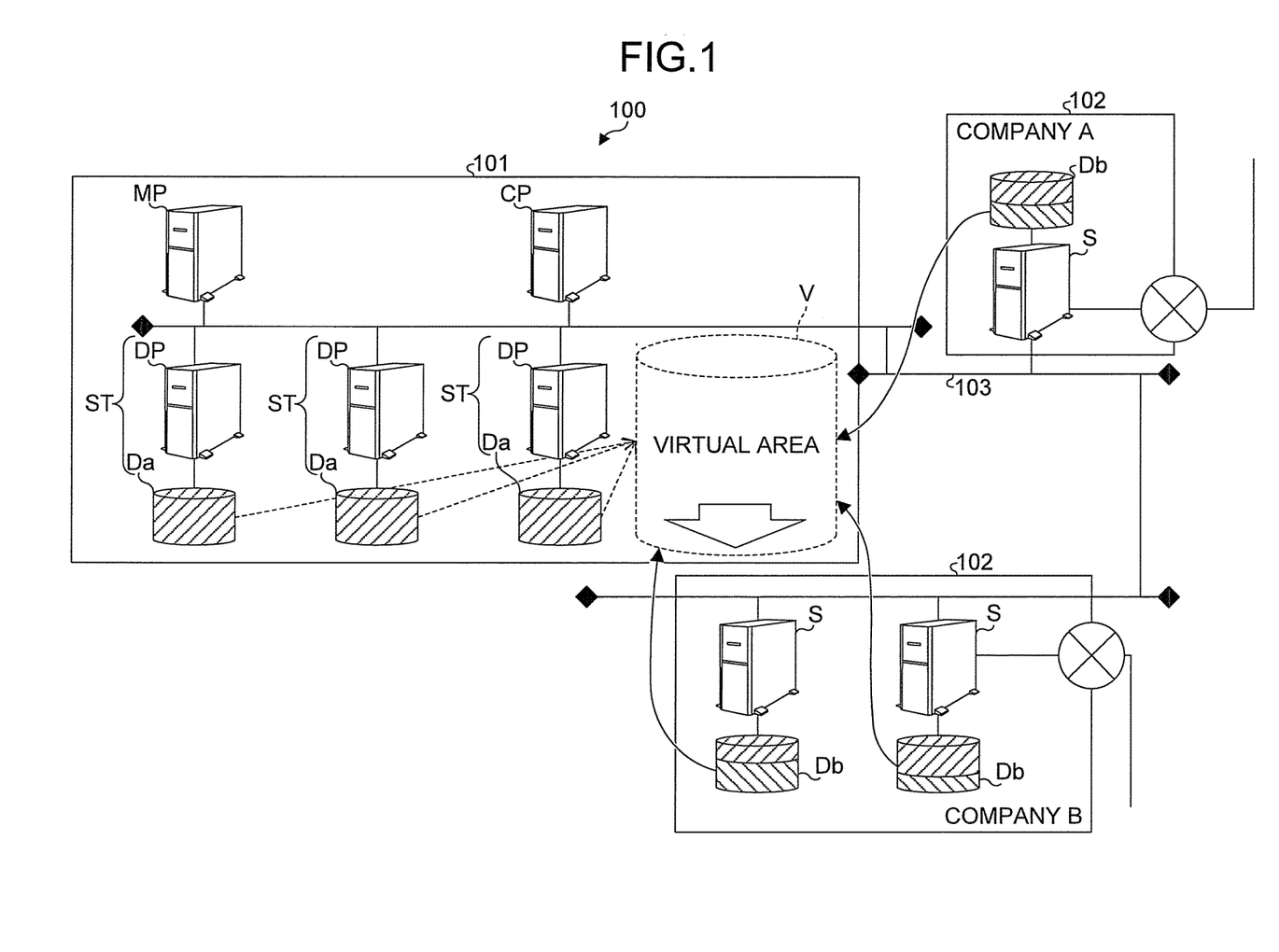
FIG. 1 shows a system configuration of a storage system according to technologies of an embodiment.

FIG. 1 shows a system configuration of the storage system 100 achieved through technologies of an embodiment. The storage system 100 includes a data center 101 and a group of business systems 102. In the storage system 100, the data center 101 and a group of business systems 102 are communicably connected to each other via a network 103 including a local area network (LAN), a wide area network (VVAN), the Internet, and so forth.

The data center 101 is a system configured to provide storage service to the group of business systems 102. The storage service denotes an operation including a computer processing performed to provide data reading and/or data writing to each of the business systems 102. The data center 101 includes a management node MP, a control node CP, and a plurality of storage devices ST. The management node MP is a computer configured to manage the business server S installed at the service provide destination. The control node CP is a computer configured to collectively manage the disk areas of all of physical disks Da.

The storage device ST includes a disk node DP and the physical disk Da. The disk node DP is a computer configured to read and/or write data from and/or onto the physical disk Da under the control of the control node CP. The physical disk Da includes a hard disk, a nonvolatile memory, and a magnetic tape.

Generally, disk areas are generated on the physical disk Da in the unit slice. The slice is allocated to each of the business servers S through the management node MR The slice allocated to a certain business server S extends over a plurality of the physical disks Da. To each of the business servers S, however, the physical disks Da are recognized as a single physical disk. Therefore, the disk areas of all of the physical disks Da are referred to as the virtual area V (or a virtual disk).

The business system 102 is configured to provide various tasks (for example, a Web service, a search service, a storage service, and so forth) and includes the business server S and a physical disk Db specifically provided for the business server S. The business server S is a computer accepting a storage allocation service presented by the data center 101. Each of the business servers S may read data stored in the virtual area V and/or write data onto the virtual area V. In actuality, each of the business servers S accesses a slice generated in the physical disk Da of the disk node DP, the slice being allocated to the business server S, and reads and/or writes data from and/or onto the slice.

According to the technologies disclosed in this application, when the physical disk Db provided in the business server S includes an available area, the available area is incorporated into the virtual area V as is the case with the physical disk Da provided in the data center 101. Accordingly, the available area of the physical disk Db of the business server S becomes the virtual area V as is the case with the physical disk Da provided in the data center 101, which allows for making efficient use of resources. For example, an available area included in the physical disk Db of the business server S of a certain business system 102 (e.g., a business system of a company A) is incorporated into the virtual area V. Consequently, the business server S of a different business system 102 which may be, for example, the business system of a company B, or the business system of each of companies C, D, and so forth (not shown) may use the increased virtual area V.

Figure 2:
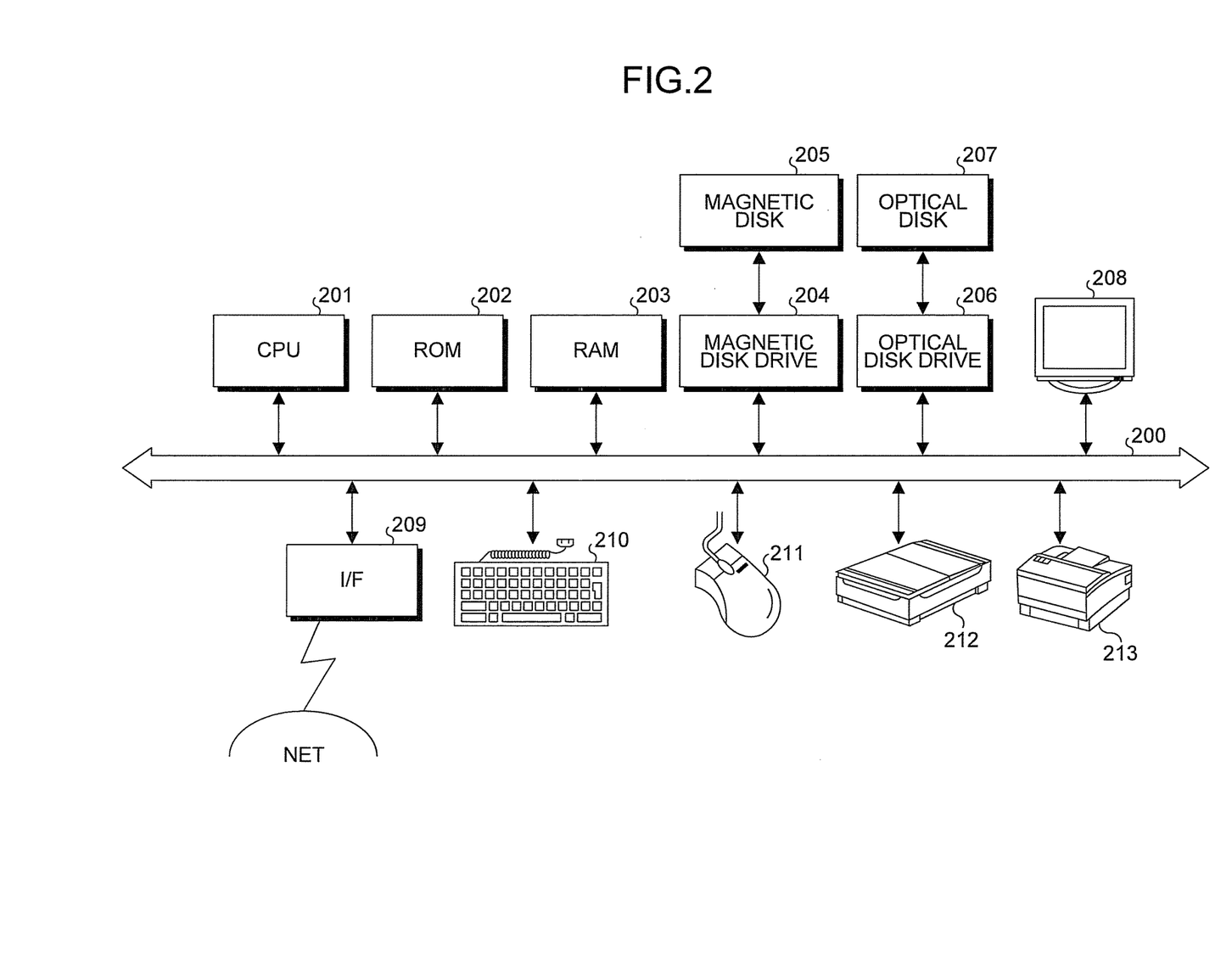
FIG. 2 is a block diagram showing a hardware configuration of a computer.

FIG. 2 is a block diagram showing a hardware configuration of a computer. In FIG. 2, the computer may include a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213. The above-described components are connected to one another via a bus 200.

Here, the CPU 201 controls the entire computer. The ROM 202 stores data including data of a program such as a boot program. The RAM 203 is used as a work area of the CPU 201. The magnetic disk drive 204 controls reading and/or writing data from and/or onto the magnetic disk 205 under the control of the CPU 201. The magnetic disk 205 stores data written thereon under the control of the magnetic disk drive 204.

The optical disk drive 206 controls reading and/or writing data from and/or onto the optical disk 207 under the control of the CPU 201. The optical disk 207 is provided to store data written under the control of the optical disk drive 206 and/or make a computer read the data stored in the optical disk 207.

The display 208 displays a cursor, an icon, and a tool box, and data including text data, image data, functional information, and so forth. The display 208 may be, for example, a cathode-ray tube (CRT), a thin-film transistor (TFT) liquid crystal display, a plasma display, and so forth.

The interface (hereinafter abbreviated as an I/F) 209 is connected to the network 103 including a LAN, a WAN, the Internet, and so forth via a communication line, and is connected to a different device via the network 103. Then, the I/F 209 interfaces between the network 103 and the internal components to control data transmitted from and/or to an external device. The I/F 209 may be, for example, a modem, a LAN adapter, and so forth.

The keyboard 210, which includes keys that are used to transmit character data, numerical data, data of various instructions, and so forth, is provided to transmit data. The keyboard 210 may be a touch panel-type input pad and/or a touch panel-type numeric keypad. The mouse 211 may be a trackball, a joystick, and so forth so long as the mouse 211 may function as a pointing device configured to move a cursor, select an area, move a window, change the window size, etc.

The scanner 212 is configured to optically read image data, and capture and transmit the image data to the computer. Here, the scanner 212 may have an optical character reader (OCR) function. Further, the printer 213 is configured to print image data and/or text data. The printer 213 may be, for example, a laser printer and/or an inkjet printer.

Next, various types of table data used for the technologies disclosed in this application are described in detail. More specifically, the functions of the following table data are achieved through a storage medium including, for example, the ROM 202, the RAM 203, and the magnetic disk 205 that are shown in FIG. 2.

Figure 3:
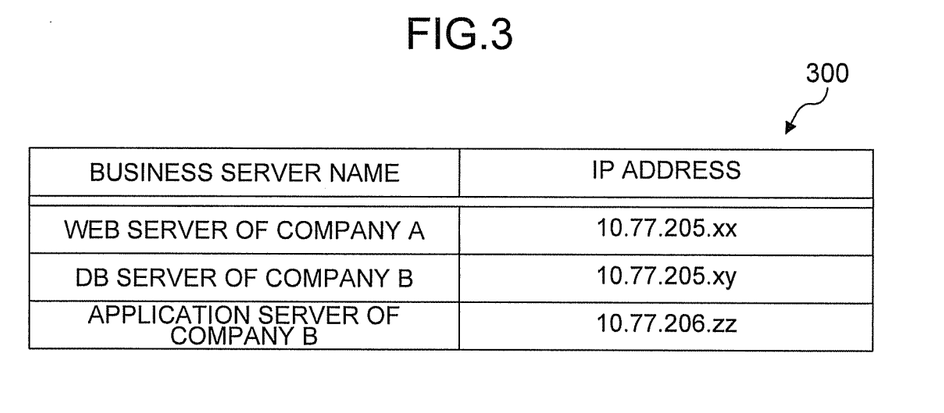
FIG. 3 illustrates the details of business server list table data.

FIG. 3 illustrates the details of business server list table data 300 with which a location (the Internet protocol (IP) address, for example) of each of the business servers S is registered. The business server list table data 300 is held in the management node MP. While a specific business identifier is illustrated in the table data 300, the present invention is not limited to any particular information and may use any data that uniquely identifies.

Figure 4:
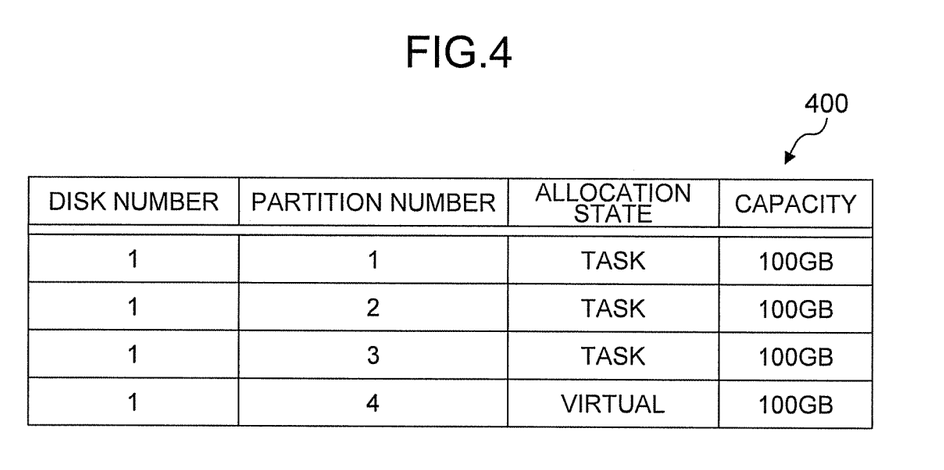
FIG. 4 illustrates the details of logical disk configuration table data.

FIG. 4 illustrates the details of logical disk configuration table data 400 showing the details of a logical disk defined through the storage system 100. The logical disk configuration table data 400 is held in each of the business servers S. The logical disk configuration table data 400 shows data of a disk number, a partition number, an allocation state, and a capacity for each logical disk. Namely, each record data indicates the partition information. The disk number denotes identifying information used to specify the physical disk Db provided in the corresponding business server S.

The partition number denotes identifying information used to specify a partition specified in the physical disk Db. The partition denotes a partial storage area obtained by dividing the physical disk Db. In FIG. 4, the physical disk Db having a physical disk Db number of 1 is divided into four partitions having respective partition numbers of 1, 2, 3, and 4.

The allocation state denotes information indicating the allocation destination of the partition. If the term "task" is shown in FIG. 4, the partition is allocated to the corresponding business server S. If the term "virtual" is shown in FIG. 4, the partition is allocated as the virtual area V. The capacity denotes a storage capacity (size) of a partition functioning as a logical disk. In this application, the storage capacities of the partitions are the same as each other (each of the storage capacities is determined to be 100 (GB) in FIG. 4).

Figure 5:
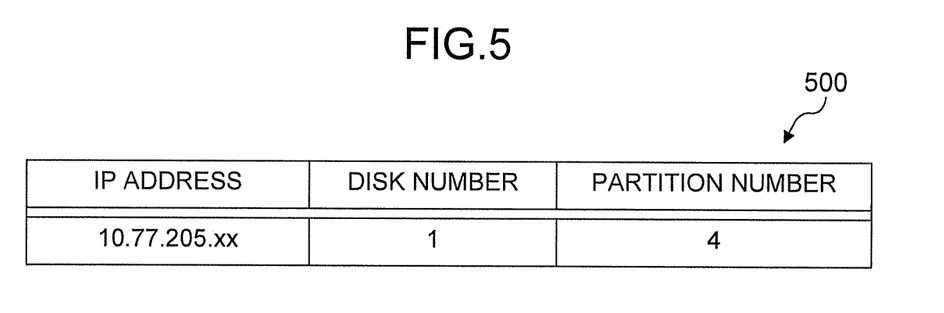
FIG. 5 illustrates the details of disk node list table data.

FIG. 5 illustrates the details of disk node list table data 500 held in the control node CP. The disk node list table data 500 shows information relating to the physical disk Db of a business server S functioning as another disk node DP.

More specifically, the disk node list table data 500 shows the IP address, the disk number of the physical disk Db, and the number of a partition specified on the physical disk Db determined based on the disk number of each of the business servers S. Namely, the record data shown on the disk node list table data 500 denotes a partition specified on the physical disk Db of the business server S, the partition being incorporated into the virtual area V.

For example, the record data shown in FIG. 5 indicates that the partition having the partition number of 4, where the partition is specified in the physical disk Db having the disk number of 1 and the physical disk Db is held in a business server S determined based on an IP address of 10.77.205.xx, is incorporated into the virtual area V. When a different partition is additionally incorporated into the virtual area V, the record data of the different partition is added to the disk node list table data 500. If the different partition is released from the virtual area V, the record data of the different partition is removed.

Figure 6:
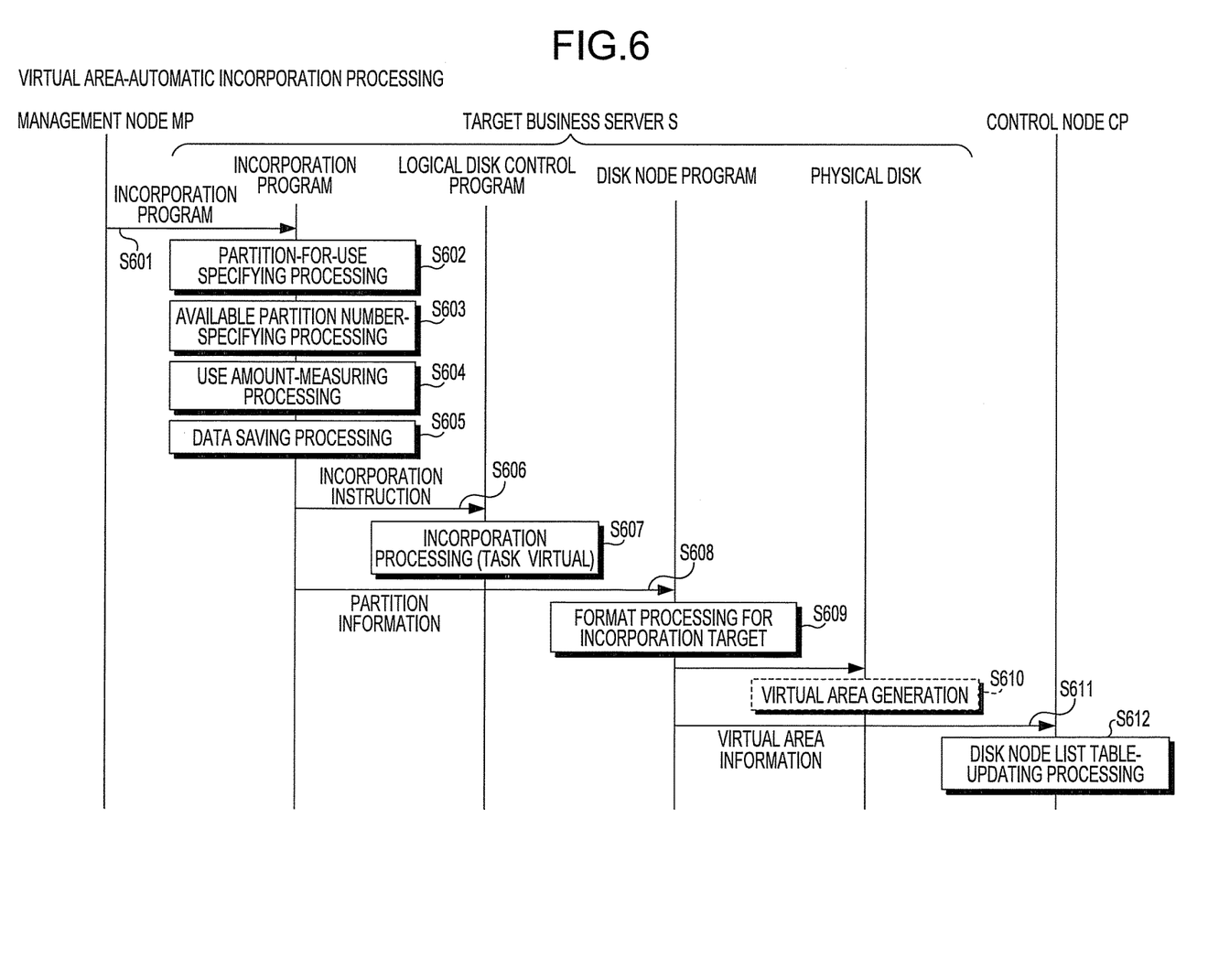
FIG. 6 is a diagram showing a sequence of virtual area-automatic incorporation processing procedures.

FIG. 6 shows the sequence of virtual area-automatic incorporation processing procedures. First, the management node MP transmits data of an incorporation program which is batch job data to the business server S determined to be a target (hereinafter referred to as a "target business server S") at predetermined time automatically and/or based on an operation instruction transmitted from a manager (operation S601). More specifically, an ssh command of Linux is executed, for example.

Upon receiving the incorporation program data, the target business server S executes partition-for-use specifying processing (operation S602), available partition number-specifying processing (operation S603), use amount-measuring processing (operation S604), and data saving processing (operation S605) based on the incorporation program.

The partition-for-use specifying processing (operation S602) is performed to specify a partition that may be used by the business server S, that is, a partition which is not allocated to the virtual area V. More specifically, an access to the logical disk configuration table data 400 is made to specify a partition which is in the allocation state shown as "task". In FIG. 4, the partitions having the respective partition numbers of 1 to 3 are exemplarily specified.

The use amount-measuring processing (operation S604) is performed to measure the current use amount of the partition specified through the partition-for-use specifying processing (operation S602). More specifically, a df command of Linux is executed, for example.

The available partition number-specifying processing (operation S603) is performed to specify the number of available partitions. For specifying the available partition number, the use amount measured through the use amount-measuring processing (operation S604) is subtracted from the total storage capacity of partitions that are specified through the partition-for-use specifying processing (operation S602). The calculation result indicates the available capacity. Next, it is determined whether or not the calculated available capacity is at least equal to the partition size.

The partition size denotes the storage capacity of a single partition (100 (GB) in FIG. 4). When a size of an available capacity is at least equal to that of a single partition, the size of an available capacity is a single partition size. Likewise, when a size of an available capacity is at least equal to that of two partitions, a size of an available capacity is more than a single partition size. Thus, the determining processing is continued until the available capacity corresponding to the size of the maximum number of partitions is determined.

The data saving processing (operation S605) is performed to compile data items in a partition and generate the available partitions corresponding to the available partition number specified through the available partition number-specifying processing (operation S603). A specific example is described in detail as below.

Figure 7A:
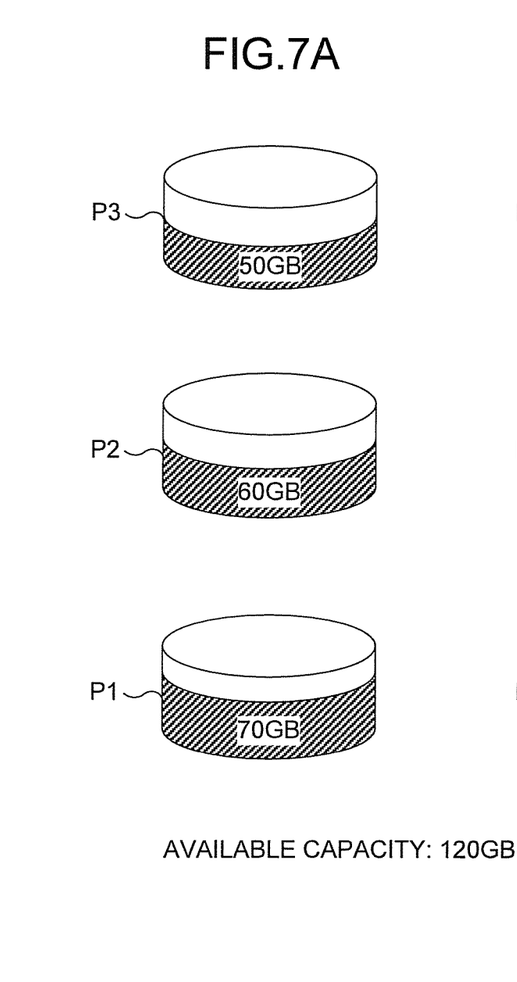
FIG. 7A specifically and exemplarily illustrates an available partition number-specifying processing and a data saving processing.
Figure 7B:
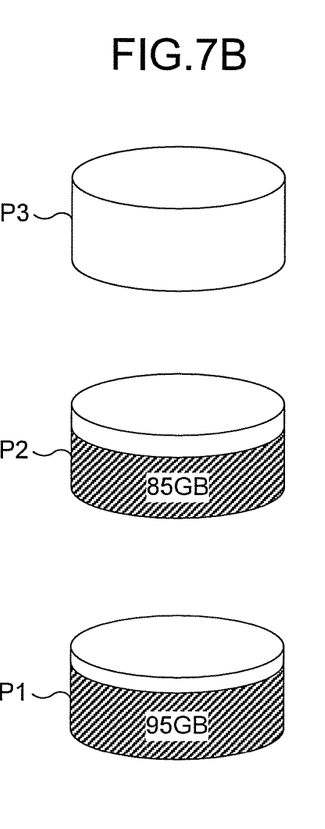
FIG. 7B also illustrates an available partition number-specifying processing and a data saving processing specifically and exemplarily.

Each of FIGS. 7A and 7B illustrates a specific example of the available partition number-specifying processing (operation S603) and the data saving processing (operation S605). In each of FIGS. 7A and 7B, the signs P1, P2, and P3 denote respective partitions having the partition numbers of 1, 2 and 3 that are shown in FIG. 4. In this example, the use amount of the partition P1 is 70 (GB), the use amount of the partition P2 is 60 (GB), and the use amount of the partition P3 is 50 (GB). In FIG. 7A, the total storage capacity of the partitions P1, P2 and P3 is 300 (GB) and the total use amount is 180 (GB). Consequently, the available capacity of the partitions P1, P2 and P3 is 120 (GB).

In an embodiment, it is determined whether or not the available capacity of 120 (GB) is at least equal to the single partition size of 100 (GB). Since the available capacity is at least equal to the single partition size of 100 (GB) in that case, it is determined that there is the available capacity corresponding to the single partition size. Next, it is determined whether or not the available capacity of 120 (GB) is at least equal to the two partition size of 200 (GB). Since the available capacity is not at least equal to 200 (GB) in that case, it is determined that there is not the available capacity corresponding to the two partition size, but the available capacity corresponding to the single partition size.

In FIG. 7B, data of 50 (GB) stored in the partition P3 as shown in FIG. 7A is divided into two data items of 25 (GB) and the two data items are moved to the respective partitions P1 and P2. Consequently, the partition P3 is emptied and may be incorporated into the virtual area V.

Returning to FIG. 6, an incorporation instruction is transmitted (operation S606) based on the incorporation program after the data saving processing (operation S605) is finished. The incorporation instruction includes data of a partition number of an available partition. Then, a logical disk control program is started. Incorporation processing is executed based on the logical disk control program (operation S607). The incorporation processing (operation S607) is performed to access the logical disk configuration table data 400 shown in FIG. 4 and change the details of an item indicating the allocation state corresponding to the partition number data included in the incorporation instruction into "virtual".

Figure 8:
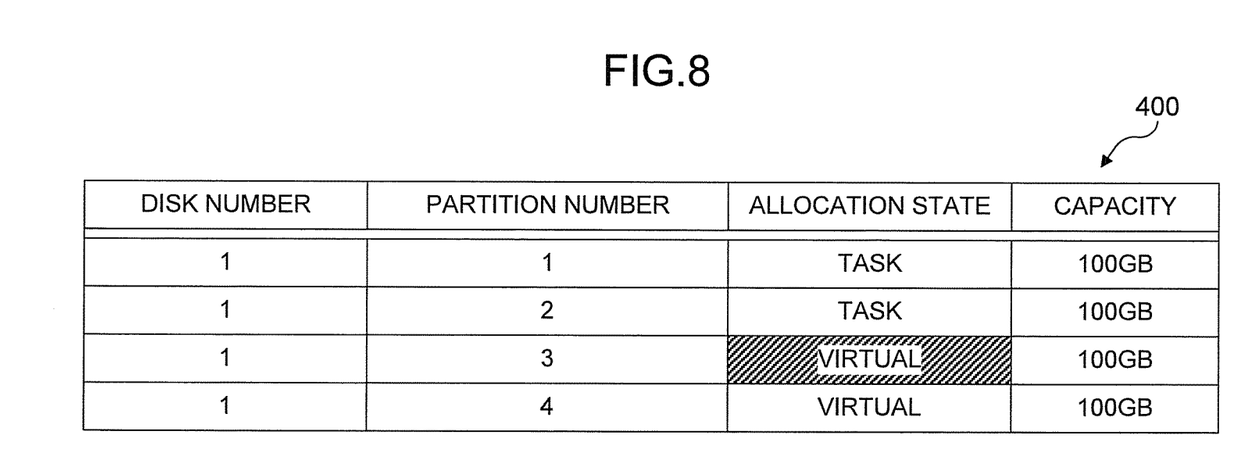
FIG. 8 illustrates the details of a logical disk configuration table data shown after changes are made therein.

FIG. 8 illustrates the details of the logical disk configuration table data 400 shown after changes are made therein. In FIG. 8, the details of the allocation state of the partition P3 having the partition number of 3 are changed from those shown in FIG. 4 to "virtual".

Returning to FIG. 6, the partition information (the partition number corresponding to the changed details "virtual") is transmitted to the disk node program based on the incorporation program (operation S608) after the incorporation processing (operation S607) is performed. Then, format processing is performed (operation S609) for an incorporation target (the partition P3 in this application). More specifically, data of all-zero value is written all over the partition P3, for example. Consequently, the virtual area V is generated on the partition P3 of the physical disk Db.

After the virtual area V is generated, virtual area information is transmitted to the control node CP based on the disk node program (operation S611). The virtual area information includes, for example, data of the IP address of a business server S where the virtual area V is set, the number of a disk where the virtual area V is set, and the number of partitions included in the physical disk Db where the virtual area V is set. In the control node CP, disk node list table-updating processing (operation S612) is executed. More specifically, the virtual area information transmitted through the operation S611 is added to the disk node list table data 500 as another item of record data.

Figure 9:
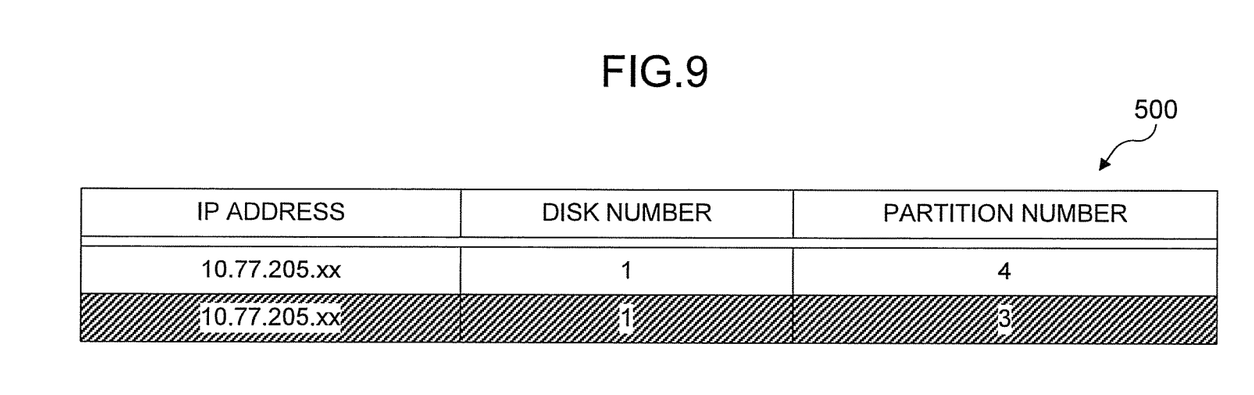
FIG. 9 illustrates an update to a disk node list table data.

FIG. 9 illustrates an update to the disk node list table data 500. In comparison with FIG. 5, it is clear that another item of record data is added to the disk node list table data 500.

Figure 10:
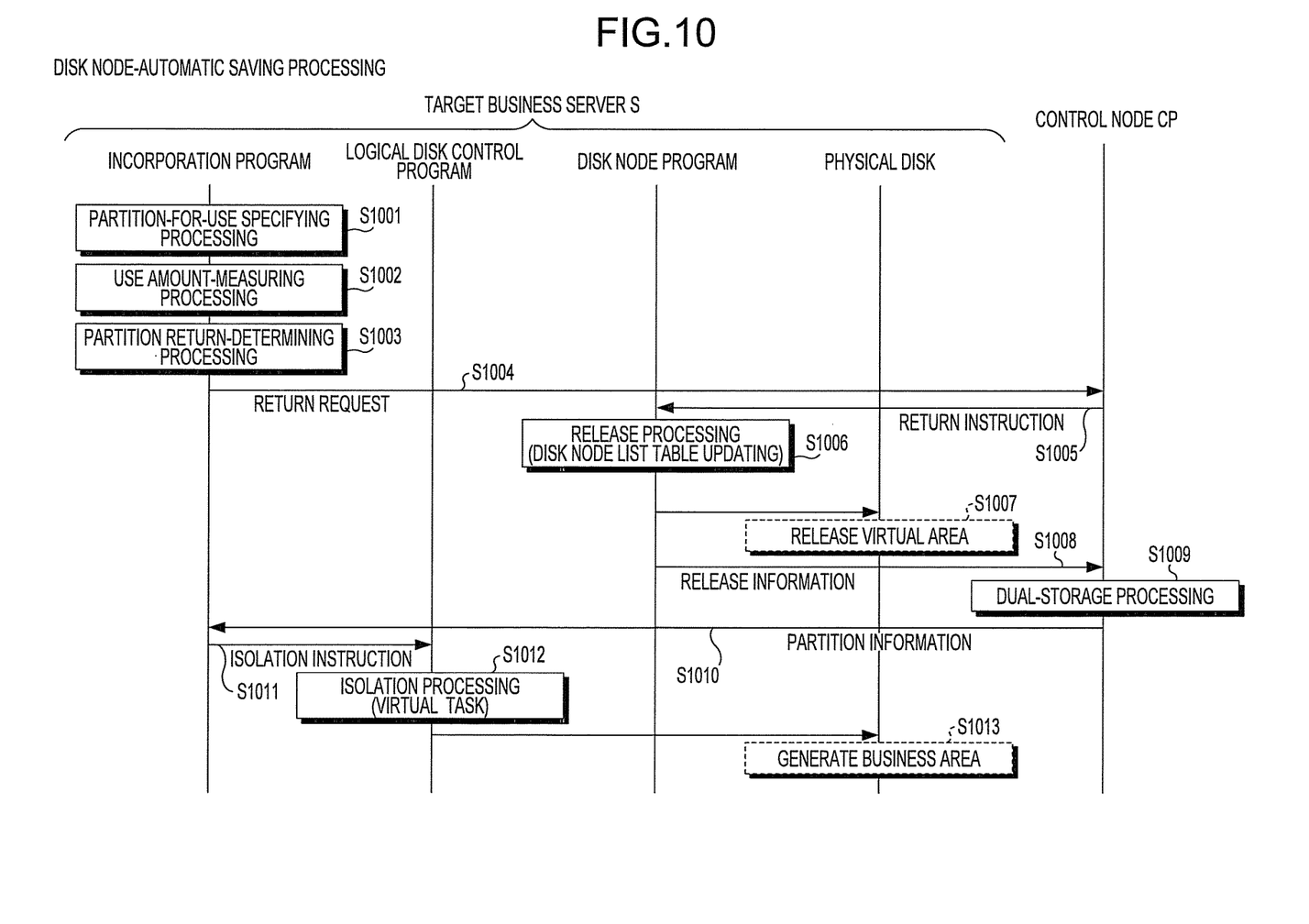
FIG. 10 is a diagram showing a sequence of virtual area-automatic saving processing procedures.

FIG. 10 is a diagram showing a sequence of virtual area-automatic saving processing procedures. First, a target business server S executes a partition-for-use specifying processing (operation S1001), a use amount-measuring processing (operation S1002), and a partition return-determining processing (operation S1003) at a predetermined time automatically and/or based on an operation instruction.

The details of the partition-for-use specifying processing (operation S1001) are equivalent to those of the partition-for-use specifying processing (operation S602) shown in FIG. 6, and the details of the use amount-measuring processing (operation S1002) are equivalent to those of the use amount-measuring processing (operation S604).

During the partition return-determining processing (operation S1003), it is determined whether or not the partition set to the virtual area V should be returned, that is to say, whether or not the partition should be released from the virtual area V and allocated only to the target business server S. More specifically, the use amount measured through the use amount-measuring processing (operation S1002) is subtracted from a total storage capacity of partitions specified through the partition-for-use specifying processing (operation S1001). The calculation result indicates the available capacity.

Next, it is determined whether or not the calculated available capacity is larger than an available capacity determined to be a threshold value. If the calculated available capacity is smaller than the available capacity determined to be the threshold value, the capacity of the target business server S is insufficient. Therefore, data of a request to return the partition set to the virtual area V is transmitted to the control node CP (operation S1004). The return request data may include data of the IP address of the target business server S, the partition number of the partition set to the virtual area V, and the disk number of the physical disk Db including the partition. If the calculated available capacity is larger than the available capacity determined to be the threshold value, it is determined that there is enough available capacity and no return request is issued.

Upon receiving the return request data, the control node CP transmits data of a return instruction to the disk node program (operation S1005). The return instruction data may include the same data as that of the return request data, that is, the data of the IP address of the target business server S, the partition number of the partition set to the virtual area V, and the disk number of the physical disk Db including the partition. Upon receiving the return instruction data transmitted from the control node CP, the disk node program executes a release processing (operation S1006).

More specifically, appropriate record data included in the disk node list table data 500 is specified based on the partition number set to the virtual area V, the partition number data being embedded in the return instruction data, and the specified record data is removed from the disk node list table data 500. Consequently, it becomes difficult for the control node CP to identify that the corresponding partition is the virtual area V so that the partition is released (operation S1007). After that, the disk node program transmits release information to the control node CP (operation S1008). The release information is information about a partition released from the virtual area V (the partition number corresponding to the allocation state of which details are changed to "task").

Upon receiving the release information, the control node CP executes a data dual storage-processing (operation S1009) due to a decrease in the virtual area V. Since the dual storage processing is generally discussed in, for example, the above-described patent document, that is, Japanese Laid-open Patent Publication No. 2005-004681, the description thereof will be omitted. After that, the control node CP transmits the partition information included in the release information to the incorporation program (operation S1010). Upon receiving the partition information, the incorporation program transmits data of an instruction to isolate the partition specified based on the partition information from the virtual area V to the logical disk control program (operation S1011).

After that, the logical disk control program is started to execute an isolation processing (operation S1012) to access the logical disk configuration table data 400 shown in FIG. 4 and change the details of an item indicating the allocation state corresponding to the partition number data included in the partition information (operation S1010) into "task".

When the partition P3 is released from the virtual area V, the details of the allocation state of the partition P3 having the partition number of 3 shown on the logical disk configuration table data 400 are changed from "virtual" shown in FIG. 8 to "task". In that case, the details of the allocation state are returned to those of the allocation state shown in FIG. 4. Accordingly, the partition released from the virtual area V becomes a storage area used only by the target business server S as a business area (operation S1013).

Figure 11:
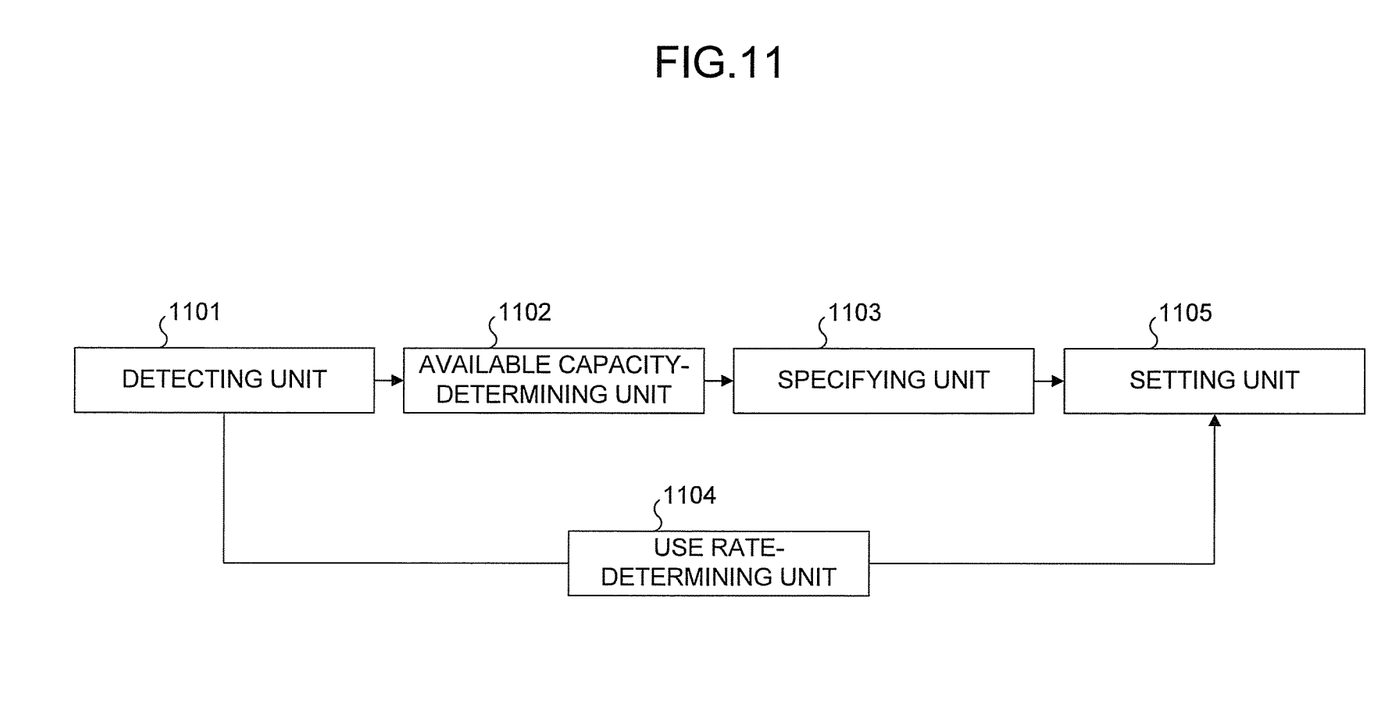
FIG. 11 is a block diagram showing a functional configuration of a business server/a storage system.

FIG. 11 is a block diagram showing a functional configuration of the business server S/storage system 100. In FIG. 11, the business server S/storage system 100 may include a detecting unit (module) 1101, an available capacity determining unit (module) 1102, a specifying unit (module) 1103, a use rate-determining unit (module) 1104, and a setting unit (module) 1105. More specifically, the above-described functions (including that of the detecting module 1101 to the setting module 1105) that are provided as a control unit are achieved by, for example, making the CPU 201 execute a program stored in a storage device including the ROM 202, the RAM 203, the magnetic disk 205, the optical disk 207 that are exemplarily shown in FIG. 2, and/or the I/F 209.

The detecting module 1101 has a function of detecting an available capacity of a specified storage which is not included in a group of storage devices, the specified storage device may be used only by a predetermined server selected from among a plurality of servers. More specifically, the available capacity of the physical disk Db specifically provided for a target business server S selected from among the group of business servers S is detected, for example. Still more specifically, the above-described processing corresponds to the partition-for-use specifying processing (operation S602) and the use amount-measuring processing (operation S604) of the virtual area-automatic incorporation processing shown in FIG. 6. Further, the above-described processing corresponds to the partition-for-use specifying processing (operation S1001) and the use amount-measuring processing (operation S1002) of the virtual area-automatic saving processing shown in FIG. 10.

The available capacity-determining module 1102 has a function of determining whether or not the available capacity detected through the detecting module 1101 is at least equal to a predetermined available capacity. More specifically, the available capacity-determining module 1102 determines whether or not the available capacity is at least equal to the single partition size, the two partition size, . . . , and the n partition size. Still more specifically, the above-described processing corresponds to the available partition number-specifying processing (operation S603) of the virtual area-automatic incorporation processing shown in FIG. 6.

The specifying module 1103 has a function of specifying the available area corresponding to the available capacity detected from a predetermined storage device through the detecting module 1101. More specifically, the specifying module 1103 specifies the available area corresponding to the detected available capacity within the physical disk Db specifically provided for the target business server S, for example. Still more specifically, if it is determined that the available capacity is not at least equal to the n partition size, the partition number is determined to be (n−1). When the partition size is determined to be m (GB), the available capacity is shown as (n−1)×m. The above-described processing corresponds to the available partition number-specifying processing (operation S603) of the virtual area-automatic incorporation processing shown in FIG. 6.

The use rate-determining module 1104 has a function of determining whether or not a use rate of a residual storage area other than a shared storage area of a predetermined storage device is at least equal to a predetermined use rate. More specifically, for example, it is determined whether or not the use rate of a residual partition exclusive of the virtual area V, the partition being included in the physical disk Db specifically provided for the target business server S, is at least equal to the predetermined use rate. For example, it is determined that whether or not the use amount of the total storage capacity of the residual partition is at least equal to a predetermined threshold value. The above-described processing corresponds to the partition return-determining processing (operation S1003) of the virtual area-automatic saving processing shown in FIG. 10.

The setting module 1105 has a function of setting the available area specified through the specifying module 1103 to a shared storage area that may be shared among the group of servers. More specifically, the partition corresponding to the available area is set to the virtual area V that may be shared among the group of the business servers S. The above-described processing corresponds to the incorporation processing (operation S607) and the disk node list table-updating processing (operation S612) of the virtual area-automatic incorporation processing shown in FIG. 6.

Further, the setting module 1105 has a function of setting the shared storage area to a storage area used only by a predetermined server when the use rate-determining module 1104 determines that the use rate of the residual storage area is at least equal to the predetermined use rate. More specifically, for example, when the use amount of the total storage capacity of the residual partition is at least equal to the predetermined threshold value, the partition specified in the physical disk Db specifically provided for the target business server S, the partition being included in the virtual area V, is determined to be a partition used only by the target business server S. The above-described processing corresponds to the release processing (operation S1006) and the isolation processing (operation S1012) of the virtual area-automatic saving processing shown in FIG. 10.

Thus, according to embodiments of technologies disclosed in this application, the available areas of the storage device held in the business server S itself are incorporated into the virtual area V when the available areas are increased so that the storage devices provided in the storage system 100 may be used with efficiency.

Further, it becomes possible to specify the partition corresponding to the available capacity as an available area by determining the available capacity. Therefore, the partition included in the virtual area V and the partition used only by the business server S may coexist on the physical disk Db of the business server S without any problems, which allows for making efficient use of resources.

Further, the available area is isolated from the virtual area V when the available areas of the storage held in the business server S itself are decreased, which makes it possible to address a problem occurring when the available capacity of the business server S becomes insufficient. Consequently, it becomes possible to make efficient use of the storage of the business server S.

A method of providing a storage service is implemented by determining availability of a storage area assigned to a first of server groups and generating a virtual storage area incorporating the storage area when the determining indicates availability, where the virtual storage is made useable across a second of the server groups. This for example, enables a storage area to be selectively made available based on demand and need without being required to strict assignments of storage areas.

The storage control method according to the above-described embodiments may be achieved by executing a predetermined program through a computer including a personal computer, a work station, and so forth. The storage control program is stored in a computer-readable recording medium including a hard disk, a flexible disk, a CD-ROM, an MO, a DVD, and so forth, and is executed by the computer reading the storage control program from the recording medium. Further, the storage control program may be distributed via a network including the Internet or the like.

Accordingly, as mentioned above, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A storage system including a plurality of servers and a control server configured to select a storage area available to be used by each of the servers from among storage areas of a group of storage devices sharable among the plurality of servers, the system comprising:
   a memory to store a program; and
   a processor to execute an operation based on the program, the operation including:
      detecting an available capacity of a specified storage device other than the group;
      setting an available area of the available capacity pre-specified for use for a task by a selected server to a virtual area sharable across all of the servers, the setting changing an allocation state of the available area to one of the virtual area and the task based on the detecting relative to a threshold value; and
      enabling access to the virtual area by any one of the servers, where the allocation state of the available area is returned to the task when detecting the available capacity is less than the threshold value.

2. The system according to claim 1, the operation comprising:
   determining whether the detected available capacity is at least equal to a predetermined available capacity, and
   wherein when the determining indicates that the detected available capacity is at least equal to the predetermined available capacity, the setting includes specifying an available area corresponding to the available capacity detected from the specified storage device through the detecting.

3. The system according to claim 1, the operation comprising:
   determining whether a use rate of a residual storage area other than the shared storage area set by the setting of the specified storage device is at least equal to a predetermined use rate, and
   wherein when the use rate of the residual storage area is at least equal to the predetermined use rate, the shared storage area is set to a storage area used only by the specified server.

4. The system according to claim 2, the operation comprising:
   determining whether a use rate of a residual storage area other than the shared storage area set is at least equal to a predetermined use rate, and
   wherein when the use rate of the residual storage area is determined to be at least equal to the predetermined use rate, the shared storage area is set to a storage area used only by the specified server.

5. A storage control method executed by a computer including a storage system including a plurality of servers and a control server configured to select a storage area available to be used by each of the servers from among storage areas of a group of storage devices sharable among the plurality of servers, the method comprising:
   detecting an available capacity of a specified storage device other than the group;
   setting an available area of the available capacity pre-specified for use for a task by a selected server to a virtual area sharable across all of the servers, the setting changing an allocation state of the available area to one of the virtual area and the task based on the detecting relative to a threshold value; and
   enabling access to the virtual area by any one of the servers, where the allocation state of the available area is returned to the task when detecting the available capacity is less than the threshold value.

6. The method according to claim 5, comprising:
   executing an available capacity-determining procedure provided to determine whether the detected available capacity is at least equal to a predetermined available capacity, and
   wherein when determining that the detected available capacity is at least equal to the predetermined available capacity through the available capacity-determining procedure, an available area corresponding to the available capacity detected from the specified storage device is specified.

7. The method according to claim 5, comprising:
   executing a use rate-determining procedure provided to determine whether a use rate of a residual storage area other than the shared storage area set through the setting of the specified storage device is at least equal to a predetermined use rate, and
   wherein when determining that the use rate of the residual storage area is at least equal to the predetermined use rate through the use rate-determining procedure, the shared storage area is set to a storage area used only by the specified server.

8. The method according to claim 6, comprising:
   executing a use rate-determining procedure provided to determine whether a use rate of a residual storage area other than the shared storage area set through the setting of the specified storage device is at least equal to a predetermined use rate, and wherein when determining that the use rate of the residual storage area is at least equal to the predetermined use rate through the use rate-determining procedure, the shared storage area is set to a storage area used only by the specified server.

9. The method according to claim 5, comprising:

collecting a partition of an available area detected and accumulating a shared storage area that includes the specified storage device pre-specified for use only by the specified server; and the setting includes setting the partition collected to a shared storage area that is available to be shared among the servers.

10. A non-transitory computer-readable recording medium that stores a storage control program for a computer that constitutes a storage system including a plurality of servers and a control server configured to select a storage area available to be used by each of the servers from among storage areas of a group of storage devices sharable among the plurality of servers, the storage control program causing the computer processor to execute a process comprising:

detecting an available capacity of a specified storage device other than the group;

setting an available area of the available capacity pre-specified for use for a task by a selected server to a virtual area sharable across all of the servers, the setting changing an allocation state of the available area to one of the virtual area and the task based on the detecting relative to a threshold value; and enabling access to the virtual area by any one of the servers, where the allocation state of the available area is returned to the task when detecting the available capacity is less than the threshold value.

11. The non-transitory computer-readable recording medium according to claim 10, comprising:

determining whether the detected available capacity is at least equal to a predetermined available capacity, and wherein when determining that the detected available capacity is at least equal to the predetermined available capacity through the determination, specifying an available area corresponding to the available capacity detected from the specified storage device through the detection.

12. The non-transitory computer-readable recording medium according to claim 10, comprising:

determining whether a use rate of a residual storage area other than the shared storage area set through the setting of the specified storage device is at least equal to a predetermined use rate, and wherein when determining that the use rate of the residual storage area is at least equal to the predetermined use rate through the determination, the setting includes specifying the shared storage area to a storage area used only by the specified server.

13. The non-transitory computer-readable recording medium according to claim 11, comprising:

determining whether a use rate of a residual storage area other than the shared storage area set through the setting of the specified storage device is at least equal to a predetermined use rate, and wherein when determining that the use rate of the residual storage area is at least equal to the predetermined use rate through the determination, the setting includes specifying the shared storage area to a storage area used only by the specified server.

* * * * *